INVENTOR.
GEORGE DAVIS
BY Kenneth C. Witt
ATTY.

June 23, 1959 G. DAVIS 2,891,644
CLUTCH OR BRAKE MECHANISM
Filed Sept. 29, 1954 3 Sheets-Sheet 3

INVENTOR.
GEORGE DAVIS
BY Kenneth C. Witt
ATTY.

United States Patent Office 2,891,644
Patented June 23, 1959

2,891,644

CLUTCH OR BRAKE MECHANISM

George Davis, Benton Harbor, Mich.

Application September 29, 1954, Serial No. 464,586
(Filed under Rule 47(b) and 35 U.S.C. 118)

1 Claim. (Cl. 192—75)

This invention relates to clutches and brakes of the internally expanding type. The mechanism of the present invention is particularly useful for clutches or brakes for hoisting drums, but it is not limited to such use.

The object of this invention is to provide an improved shoe-type clutch or brake mechanism which is inexpensive to manufacture and in which the component parts are readily accessible for inspection, adjustment and repair.

A feature of one form of my invention is that identical parts can be assembled in either of two ways so as to provide a clutch or brake suitable for either direction of rotation.

In carrying out by invention in one form I provide a mechanism which includes a plate member on which segmental shoes are pivotally mounted, a drum member having a portion encircling the plate member, and a rotatable shaft on which the plate member and the drum member are mounted, with one of these members being fixed to the shaft and the other rotatable on the shaft. A plurality of the segmental shoes are arranged at equal intervals around the plate member, and these shoes have friction material on the outer arcuate surface for engaging the drum member. Each of the shoes is piovtally mounted adjacent one end thereof on the plate member, the pivotal connection being adjacent the same end on each shoe, and a plurality of pivoted operating members are provided for forcing the shoes against the drum. The operating members are pivoted on transverse axes so that they operate in planes which include the axis of the shaft. Each operating member includes an outwardly facing portion which applies pressure to one of the shoes and an inwardly extending portion terminating adjacent the shaft to which force is applied for actuating the clutch or brake mechanism.

Figure 1:
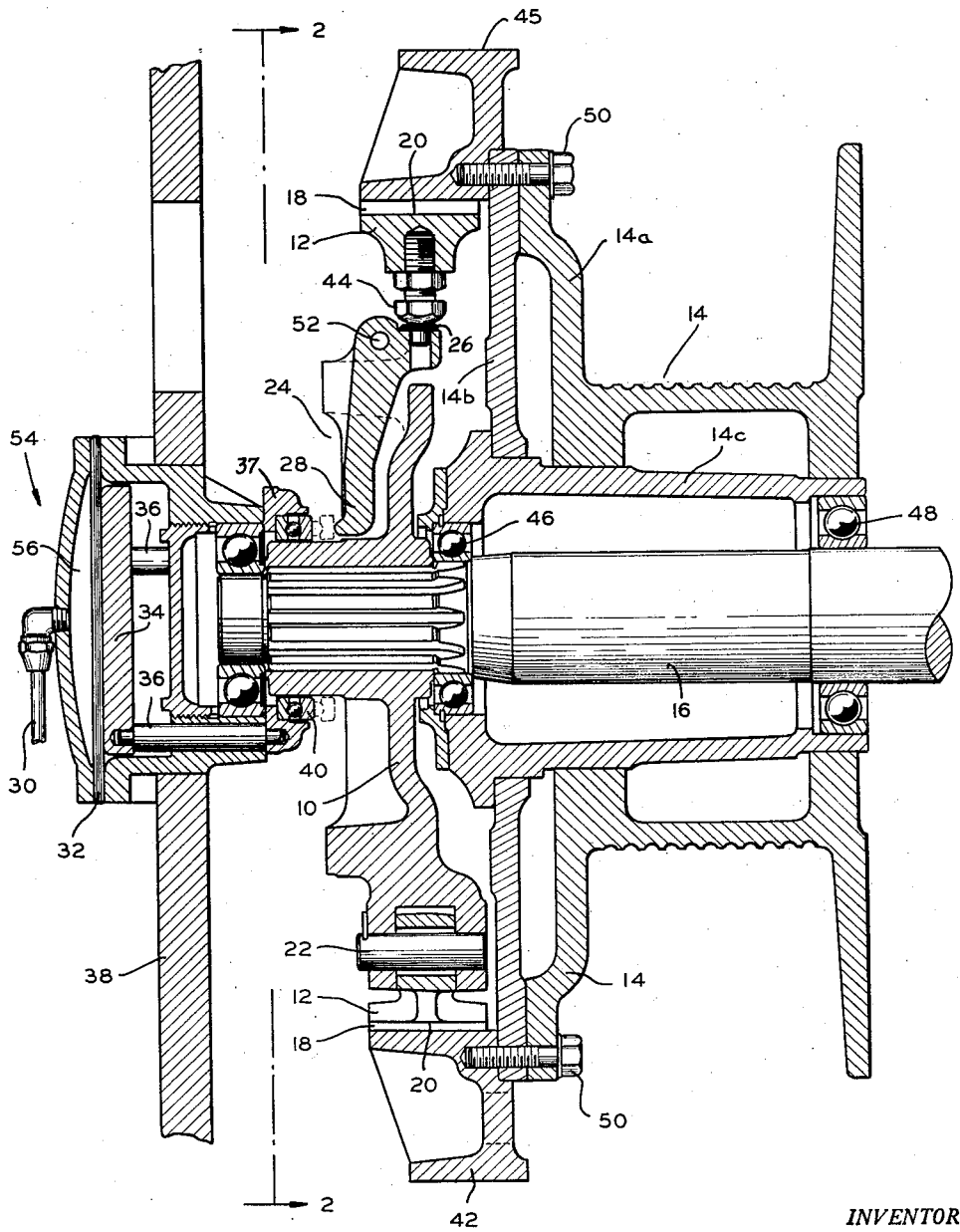
Figure 2:
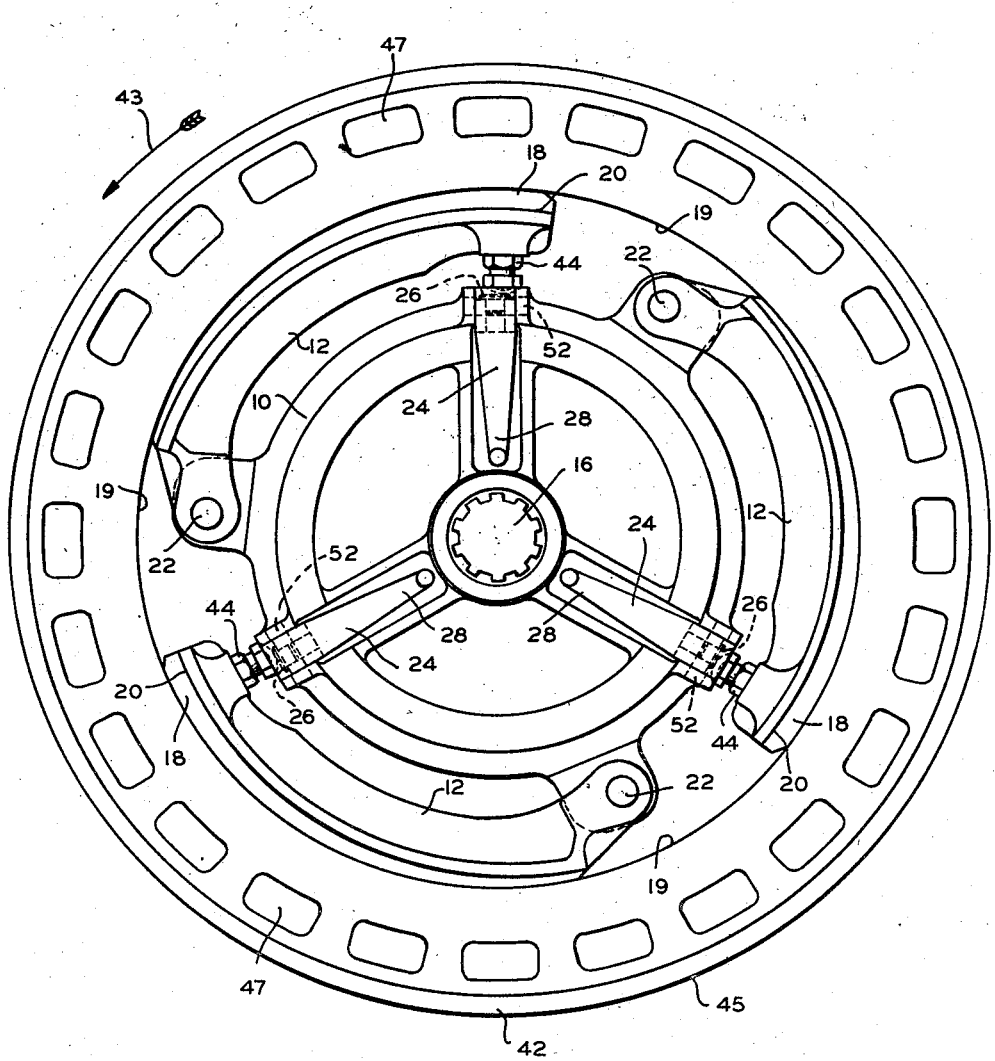
Figure 3:
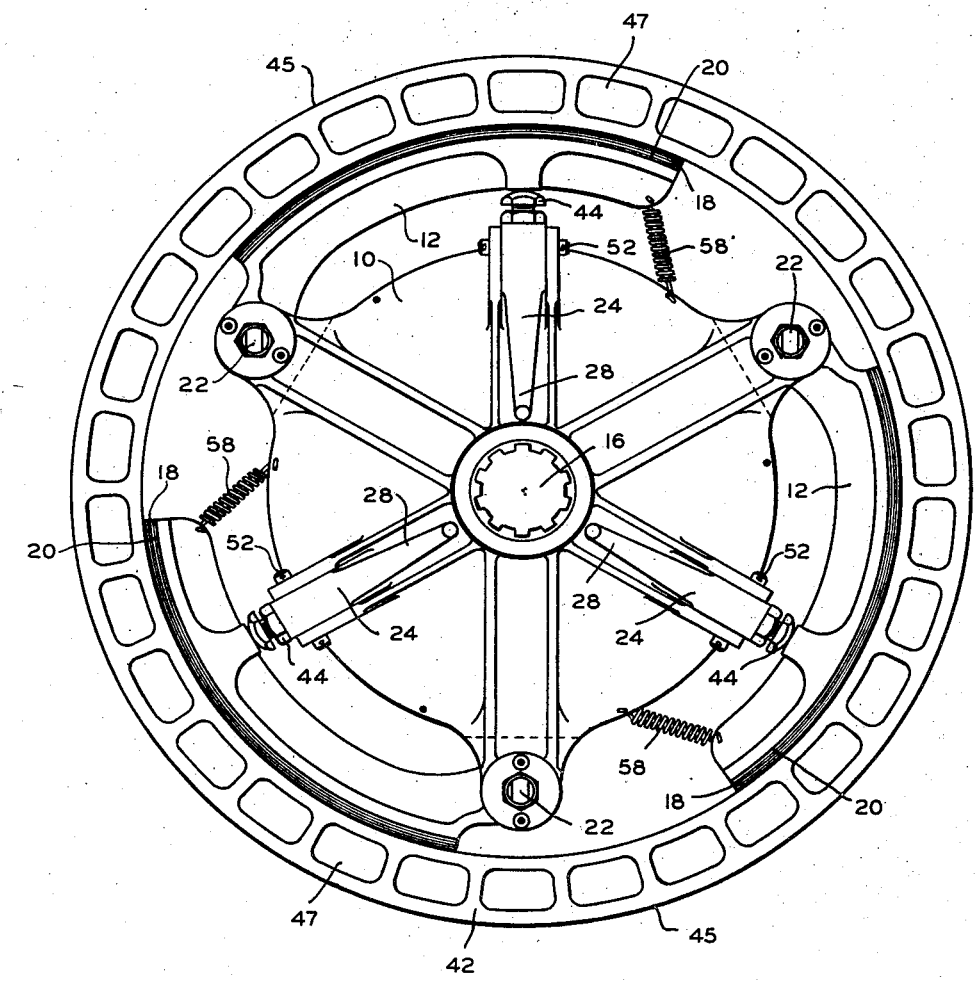

For a clearer and more complete understanding of my invention, reference should be had to the accompanying drawing in which Figure 1 is an elevational view in section of a mechanism embodying one form of my invention, Figure 2 is a view along line 2—2 of Figure 1, and Figure 3 is a view similar to Figure 2 of another embodiment of the invention.

Referring now to Figs. 1 and 2 of the drawings, a rotatable shaft 16 has a plate member 10 connected to the shaft 16 by splines or other suitable means. The plate 10 carries a plurality of segmental shoe members 12 which are pivotally mounted on the plate member at substantially equal intervals circumferentially around said plate member. Each shoe member 12 is piovtally mounted on plate 10 about an axis parallel to the axis of said shaft 16, by means of a pin 22. The shoe members 12 each have friction material 18 on the outer arcuate surface 20, in a conventional manner, for engaging the cylindrical surface 19 on an encircling clutch drum 42.

A plurality of operating members 24 are pivotally mounted on said plate member 10 in equally spaced radially disposed arrangement, the said operating members 24 being pivoted on pins 52 about transverse axes whereby their motion occurs respectively in planes which include the axis of said shaft 16. Each of the operating members 24 has an outwardly facing portion 26 which applies pressure to one of said shoes 12 at a point remote from its pivotal mounting on plate member 10. Each operating member 24 includes also an inwardly extending portion 28 terminating adjacent to said shaft 16.

An air operating mechanism indicated generally by the numeral 54 is arranged to produce movement of the inwardly extending portions 28. As illustrated, mechanism 54 is mounted on a fixed member 38 which may be a portion of the frame of a machine in which the present invention is used. Operating mechanism 54 produces a force on a bearing device 40 which comprises a pair of axially spaced confronting race ring members having rolling elements between the race rings. The bearing 40 applies force to inwardly extending portions 28 which pivot the operating members 24 about said pivot pins 52. This causes outwardly facing portions 26 of operating members 24 to contact adjusting screws 44 on the shoes 12, thus actuating said shoe members 12, which, in turn, forces the friction material 18 into engagement with clutch drum member 42 thereby causing said drum member 42 to rotate with plate member 10.

The friction material 18 on the shoe members 12 in Fig. 2 of the drawing is tapered, the friction material on each shoe being thickest adjacent the end away from the shoe pivot point and thinnest at the end adjacent the pivot. It will be readily appreciated by those familiar with shoe type clutches and brakes that the maximum wear on the friction material will occur at the end away from the shoe pivot, with the wear being graduated from this end to a minimum at the other end of the shoe. This being the case, the use of tapered friction material on the shoes provides the maximum of wear with the minimum amount of friction material.

It will be appreciated also by those familiar with shoe type brakes and clutches that there will be a self-energizing action of the mechanism disclosed herein if the clutch drum is rotated counterclockwise as illustrated by the arrow 43 in Fig. 2. When the shoes are pivoted at the trailing end in the manner described and illustrated herein, the actuating force applied on the leading end of each shoe is supplemented by an additional force due to the rocking of the shoe around the pivot point, and it is this action which produces the self-energizing effect referred to. Such energization reduces the amount of force which must be applied to the leading end of the shoes to produce a certain clutching or braking action. The degree of self-energization produced by the rocking of the shoes around their pivots may be varied by shifting the location of the pivot points.

The mechanism described and illustrated herein is arranged to be used as a clutch to connect and disconnect a winding or hoisting drum 14 to the rotating shaft 16, the hoisting drum 14 being solidly connected to the clutch drum 42 in a suitable manner such as by bolts 50. Anti-friction bearing devices are provided at 46 and 48 which permit the shaft to rotate freely within the winding drum 14 except when the clutch is engaged. It should be understood, however, that this invention is not limited to use as a clutch for a hoisting drum and may be used with equal facility as a clutch or brake for other applications.

When this mechanism is used as a clutch for a hoisting drum in the manner described and illustrated herein the outer cylindrical surface 45 of clutch drum 42 may be utilized for the application of a surrounding band brake (not shown) in the conventional manner, for braking the clutch and the hoist drum. The clutch drum 42 may be provided with openings, as at 47, to facilitate the cooling of clutch drum 42. It will be understood by those familiar with applications of this type that considerable heat is generated by the clutch and the brake of which drum 42 forms a part.

Referring now to the aforementioned air actuating mechanism 54, air under pressure is supplied from a source, not shown, through a connection 30 into an air chamber 56. The air pressure causes a resilient diaphragm member 32 to flex and force a piston member 34 inwardly (to the right in Fig. 1). This inward motion of piston member 34 is transferred through a plurality of spaced pins 36 to a collar member 37 which in turn actuates operating arms 24 through bearing device 40. This causes the shoe members 12 to contact clutch drum 42 as heretofore described, when air is admitted to connection 30 as a result of the operation of a suitable control valve (not shown).

Another embodiment of my invention is illustrated in Fig. 3 of the drawing. In this figure, like parts bear the same numbers as the corresponding parts in Figs. 1 and 2.

It will be noted in the mechanism illustrated in Fig. 3 that the pivot points 22 of the shoes and the operating levers 24 are arranged around the periphery of the plate 10 so that the plate 10 is divided into six equal segments. If radii are drawn from the center of each of the pivot points and along the center line of each of the operating members to the center of shaft 16 each adjacent pair of radii will form a 60° angle.

It will be noted also in the mechanism of Fig. 3 that the adjusting screws are on the operating members 24 and that these adjusting screws contact the shoes 12 in each case at a point which is approximately ⅓ of the distance from the free end of the shoe toward the pivot end.

With the arrangement described in the preceding paragraphs, it is possible to assemble the clutch shoes on the plate 10 for either direction of rotation, because there is an operating arm 60° away from the pivot point in both directions. As shown, the mechanism is assembled for counterclockwise rotation. If clockwise rotation is to be employed, the shoes are assembled in the opposite manner. This arrangement is particularly valuable in a hoisting mechanism as used on a power shovel or crane, because frequently in such machines there are two winding drums on the same shaft which means that the clutches at the opposite ends of the shaft must be arranged for opposite rotations. With the mechanism shown in Fig. 3, exactly the same parts can be used to assemble the clutch at either end of the shaft, merely by reversing the parts for one clutch as described.

In Fig. 3 the friction elements 18 are shown of uniform thickness instead of tapered as in Fig. 2, but it will be understood that tapered friction elements can be used in the mechanism of Fig. 3 if desired. Tension springs 58 are provided between the free ends of the shoes 12 and plate 10 for normally holding the shoes out of clutching engagement with the clutch drum.

It will be apparent from the foregoing that my invention provides a shoe type clutch or brake mechanism which is relatively inexpensive to manufacture. One of the factors contributing to this is the fact that it is possible to assemble an identical set of parts in either of two ways to provide for either rotation. This minimizes the number of parts which must be fabricated.

It will be apparent also that this mechanism is arranged so that the component parts are readily accessible for inspection, adjustment and repair. The shoes and the friction material thereon are the parts which require inspection most frequently, and which are most likely to need adjustment or repair, and it can be seen that these parts are readily accessible. As the friction material wears, adjustment is made on the adjusting screws 44 to compensate for such wear. When it is necessary to replace the friction material and/or the shoes, the shoes may be readily removed from the mechanism without disassembling any other parts merely by removing the pins 22.

Another advantage of my construction is that the shoes, along with the clutch drum, are open to the atmosphere. This facilitates the circulation of air around the parts of the clutch or brake, which aids greatly in keeping the parts from getting too hot.

While I have illustrated and described herein certain preferred embodiments of my invention, it will be apparent to those skilled in the art that modifications may be made without departing from my invention. It will be understood, therefore, that I intend to cover by the appended claim all such modifications which fall within the true spirit and scope of my invention.

In the following claim reference is made to a drum member. It should be understood that the single drum member specified in the claim may include both a clutch drum and hoist drum, as described hereinbefore inasmuch as the clutch and hoist drums are connected solidly together. In fact, the clutch and hoist drums may be formed as a single drum member if desired, although it is generally more practical to fabricate them separately and then join them by means of bolts or in any other equivalent manner.

What I claim as new and desire to secure by Letters Patent of the United States is:

A clutch or brake mechanism comprising, a rotatable shaft, a plate member mounted on the said shaft and connected to the shaft for rotation therewith, a drum member mounted on said shaft and rotatable relative thereto, the said drum member having a portion encircling the said plate member, three segmental shoes pivotally mounted on the said plate member and arranged symmetrically at substantially equal intervals circumferentially around the said plate member, the said shoes being pivoted about three axes parallel to the axis of the said shaft, each shoe being pivoted adjacent the same end thereof and each shoe pivot being closely adjacent the said drum member, the said shoes each having an outer arcuate surface extending more than one-sixth of the way circumferentially around the said plate member and having friction material on the said outer arcuate surfaces thereof for engaging the said drum member, three operating members pivotally mounted on the said plate member in an equally spaced radially disposed arrangement, the said operating members being pivoted about transverse axes whereby their motion occurs respectively in planes which include the axis of the said shaft, each of the said operating members having an outwardly facing portion which applies pressure to one of the said shoes, the said operating members being arranged in a manner such that each operating member contacts its respective shoe at a point approximately one-sixth of the way around the circumference of the plate from the said pivot point of the respective shoe, each operating member including also an inwardly extending portion terminating adjacent the said shaft, and means arranged for movement parallel to the axis of the said shaft for applying force to the said inwardly extending portions whereby to pivot the said operating members and force the said shoes against the said drum member and thereby cause the drum member to rotate with the said shaft.

References Cited in the file of this patent

UNITED STATES PATENTS

| | | |
|---|---|---|
| 139,456 | Crocker | June 3, 1873 |
| 521,240 | Kirkbride et al. | June 12, 1894 |
| 1,302,926 | Jackson | May 6, 1919 |
| 1,869,097 | Fawick | July 26, 1932 |
| 2,197,522 | Ferguson et al. | Apr. 16, 1940 |